United States Patent
Turner et al.

(10) Patent No.: US 10,499,250 B2
(45) Date of Patent: *Dec. 3, 2019

(54) RF CLIENT FOR IMPLEMENTING A HYPER DISTRIBUTION COMMUNICATIONS PROTOCOL AND MAINTAINING A DECENTRALIZED, DISTRIBUTED DATABASE AMONG RADIO NODES

(71) Applicants: William Turner, Leander, TX (US); John A. Fortkort, Austin, TX (US)

(72) Inventors: William Turner, Leander, TX (US); John A. Fortkort, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,543

(22) Filed: Jun. 22, 2018

(65) Prior Publication Data
US 2018/0376336 A1    Dec. 27, 2018

Related U.S. Application Data

(60) Provisional application No. 62/523,371, filed on Jun. 22, 2017, provisional application No. 62/523,383, (Continued)

(51) Int. Cl.
| | |
|---|---|
| *H04W 16/02* | (2009.01) |
| *H04W 12/04* | (2009.01) |
| *H04W 4/80* | (2018.01) |
| *H04W 84/18* | (2009.01) |
| *H04L 9/32* | (2006.01) |

(Continued)

(52) U.S. Cl.
CPC .......... *H04W 16/02* (2013.01); *H04L 9/3236* (2013.01); *H04W 12/04* (2013.01); *H04W 12/10* (2013.01);

(Continued)

(58) Field of Classification Search
CPC .. H04W 16/02; H04W 12/04; H04N 21/4408; H04L 5/0035

(Continued)

(56) References Cited

U.S. PATENT DOCUMENTS

| | | |
|---|---|---|
| 5,859,852 A | 1/1999 | Moura et al. |
| 6,563,919 B1 | 5/2003 | Aravamudhan et al. |

(Continued)

FOREIGN PATENT DOCUMENTS

CN    104426950 A    8/2013

OTHER PUBLICATIONS

Jason Derenick, Christopher Thorne and John Spletzer, (2005). On the deployment of a hybrid free-space optic/radio frequency (FSO/RF) mobile ad-hoc network. 2005 IEEE/RSJ International Conference on Intelligent Robots and Systems. doi:10.1109/iros.2005. 1545193.

(Continued)

*Primary Examiner* — Iqbal Zaidi
(74) *Attorney, Agent, or Firm* — John A. Fortkort; Fortkort & Houston PC (57) ABSTRACT

A system is provided which includes a plurality of RF devices, wherein each RF device contains a tangible, non-transient memory device; and a software client, an instance of which is recorded in the memory device of each of the plurality of RF devices. The software client contains suitable programming instructions which, when implemented by at least one processor of at least one computational device, implements a hyper distribution communications protocol among the RF devices and maintains a decentralized and distributed database of transactions between the RF devices.

37 Claims, 3 Drawing Sheets

Related U.S. Application Data filed on Jun. 22, 2017, provisional application No. 62/523,397, filed on Jun. 22, 2017.

(51) Int. Cl.
*H04W 12/10* (2009.01)
*H04W 12/00* (2009.01)

(52) U.S. Cl.
CPC .... *H04L 2209/38* (2013.01); *H04L 2209/805* (2013.01); *H04W 4/80* (2018.02); *H04W 12/00502* (2019.01); *H04W 84/18* (2013.01)

(58) Field of Classification Search
USPC .......................... 370/252–339; 455/441, 450
See application file for complete search history.

(56) References Cited

U.S. PATENT DOCUMENTS

| | | |
|---|---|---|
| 6,591,304 B1 | 7/2003 | Sitaraman et al. |
| 6,832,251 B1 | 12/2004 | Gelvin et al. |
| 7,382,773 B2 | 6/2008 | Schoeneberger et al. |
| 7,652,983 B1 | 1/2010 | Li et al. |
| 7,940,735 B2 | 5/2011 | Kozisek et al. |
| 7,958,230 B2 | 6/2011 | Guruswamy et al. |
| 7,965,758 B2 | 6/2011 | Picard |
| 8,064,391 B2 | 11/2011 | Kozisek et al. |
| 8,065,722 B2 | 11/2011 | Barford et al. |
| 8,224,255 B2 | 7/2012 | Coppage et al. |
| 8,325,011 B2 | 12/2012 | Butler et al. |
| 8,897,741 B2 * | 11/2014 | Johnson .............. H04L 41/0816 455/404.2 |
| 8,914,406 B1 | 12/2014 | Haugsnes et al. |
| 10,022,614 B1 | 7/2018 | Tran et al. |
| 2001/0037395 A1 | 11/2001 | Sabat, Jr. et al. |
| 2002/0046301 A1 | 4/2002 | Shannon et al. |
| 2002/0165975 A1 | 11/2002 | Abbott |
| 2002/0186723 A1 | 12/2002 | Sprague et al. |
| 2007/0233693 A1 | 10/2007 | Baxter et al. |
| 2008/0124086 A1 | 5/2008 | Matthews |
| 2009/0129277 A1 | 5/2009 | Supalov et al. |
| 2009/0322518 A1 | 12/2009 | Liang et al. |
| 2012/0310899 A1 | 12/2012 | Wasserman et al. |
| 2012/0316892 A1 | 12/2012 | Huster et al. |
| 2013/0259040 A1 | 10/2013 | Anantharam et al. |
| 2013/0279914 A1 * | 10/2013 | Brooks .............. H04Q 11/0067 398/66 |
| 2014/0162702 A1 | 6/2014 | Crawford et al. |
| 2014/0195675 A1 | 7/2014 | Silver |
| 2014/0269299 A1 | 9/2014 | Koomstra |
| 2014/0368601 A1 | 12/2014 | deCharms |
| 2015/0304011 A1 * | 10/2015 | Ponnuswamy ...... H04B 7/0452 370/329 |
| 2016/0007315 A1 | 1/2016 | Lundgreen et al. |
| 2016/0028552 A1 | 1/2016 | Spanos et al. |
| 2016/0321654 A1 | 11/2016 | Lesavich et al. |
| 2016/0359530 A1 | 12/2016 | Bennett et al. |
| 2016/0359649 A1 | 12/2016 | Bennett et al. |
| 2017/0024100 A1 | 1/2017 | Pieper et al. |
| 2017/0228731 A1 | 8/2017 | Sheng et al. |
| 2017/0238072 A1 | 8/2017 | Mackie et al. |
| 2017/0264493 A1 | 9/2017 | Cencini et al. |
| 2018/0063238 A1 | 3/2018 | Zhang |
| 2018/0097837 A1 | 4/2018 | Stolarz et al. |
| 2018/0109541 A1 | 4/2018 | Gleichauf |
| 2018/0133583 A1 | 5/2018 | Tran et al. |

OTHER PUBLICATIONS

Antonios Argyriou, Alberto Caballero Breva and Marc Aoun, Optimizing Data Forwarding from Body Area Networks in the Presence of Body Shadowing with Dual Wireless Technology Nodes. IEEE Transactions on Mobile Computing, 14(3), 632-645. doi:10.1109/tmc.2014.2321768.

Kaushal, H. & Kaddoum, G. (2017). Optical Communication in Space: Challenges and Mitigation Techniques. IEEE Communications Surveys & Tutorials, 19(1), 57-96. doi:10.1109/comst.2016.2603518.

Eslami, A., Vangala, S., & Pishro-Nik, H. (2010). Hybrid Channel Codes for Efficient FSO/RF Communication Systems. IEEE Transactions on Communications, 58(10), 2926-2938. doi:10.1109/tcomm.2010.082710.090195.

Calypso Barnes. Verification and validation of wireless sensor network protocol properties through the system's emulation. Networking and Internet Architecture [cs.NI]. Université Côte d'Azur, 2017. English. <NNT : 2017AZUR4047>. <tel-01618142>.

Milen Stefanov, Enabling next gen smart utility meters. (2012). Retrieved from https://www.embedded.com/print/4397599.

Yu, X., & Liang, J. (2018). Genetic Fuzzy Tree Based Node Moving Strategy of Target Tracking in Multimodal Wireless Sensor Network. IEEE Access, 6, 25764-25772. doi:10.1109/access.2018.2835162.

Lo, C., Hu, Y., & Li, C. (2010). A distributed communication protocol for wireless sensor networks with asynchronous superframe. IET International Conference on Frontier Computing. Theory, Technologies and Applications. doi:10.1049/cp.2010.0567.

Alcatel-Lucent Enterprise. (2017). OmniAccess Stellar WLAN Golden RFP [Brochure].

T. M. Fernández-Caramés and P. Fraga-Lamas, "A Review on the Use of Blockchain for the Internet of Things," in IEEE Access, vol. 6, pp. 32979-33001, 2018. doi: 10.1109/ACCESS.2018.2842685.

Ayaya. (Mar. 31, 2014). Avaya Extends the Automated Campus to End the Network Waiting Game [Press release]. Retrieved from https://www.avaya.com/en/about-avaya/newsroom/news-releases/2014/pr-140401/.

Cisco, SAE-GW Administration Guide, StarOS Release 20—Rf Interface Support [Cisco ASR 5000 Series]. (Mar. 23, 2017). Retrieved from https://www.cisco.com/c/en/us/td/docs/wireless/asr_5000/20/SAEGW/b_20_SAEGW_Admin/b_19_SAEGW_Admin_chapter_010100.html.

Cisco, Radio Resource Management White Paper. (Jun. 23, 2016). Retrieved from https://www.cisco.com/c/en/us/td/docs/wireless/controller/technotes/8-3/b_RRM_White_Paper.html.

BitTorrent. (Aug. 24, 2018). Retrieved from https://en.wikipedia.org/wiki/BitTorrent.

Enterprise Mobility 8.1 Design Guide—Cisco Wireless Mesh Networking [Cisco 5500 Series Wireless Controllers]. (Jul. 11, 2017). Retrieved from https://www.cisco.com/c/en/us/td/docs/wireless/controller/8-1/Enterprise-Mobility-8-1-Design-Guide/Enterprise_Mobility_8-1_Deployment_Guide/Chapter-8.html.

Communications Converged Application Server Administrator's Guide. (Apr. 26, 2016). Retrieved from https://docs.oracle.com/cd/E49461_01/doc.70/e52859/net_diameter_config.htm#CASCG317.

Volpicelli, G. (Mar. 10, 2018). Does blockchain offer hype or hope? Retrieved from https://www.theguardian.com/technology/2018/mar/10/blockchain-music-imogen-heap-provenance-finance-voting-amir-taaki.

Valadbeigi, M., Safaei, F., & Pourshirazi, B. Valadbeigi, M., Safaei, F., & Pourshirazi, B. (2013). An Energy-Efficient Reconfigurable NoC Architecture with RF-Interconnects. 2013 Euromicro Conference on Digital System Design. doi:10.1109/dsd.2013.58.

Chauvenet, C., Tourancheau, B., & Genon-Catalot, D. (2010). 802.15.4, a MAC layer solution for PLC. ACS/IEEE International Conference on Computer Systems and Applications—AICCSA 2010. doi:10.1109/aiccsa.2010.5586997.

Bernard Wong, Ymir Vigfusson & Emin Gun Sirer, Hyperspaces for Object Clustering and Approximate Matching in Peer-to-Peer Overlays. Conference: Conference: Proceedings of HotOS'07: 11th Workshop on Hot Topics in Operating Systems, May 7-9, 2005, San Diego, California, USA.

Carlos Becker Westphall, Khalil El-Khatib, Dragana Krstic & Hamid Menouar, The Thirteenth International Conference on Wireless and Mobile Communications, Jul. 23-27, 2017, Nice, France.

Lin, J. Shen, Z. Miao, C., & Liu, S. (2017). Using blockchain to build trusted LoRaWAN sharing server. International Journal of Crowd Science, 1(3), 270-280. doi:10.1108/ijcs-08-2017-0010.

(56) References Cited

OTHER PUBLICATIONS

IoT Standards & Protocols Guide | 2018 Comparisons on Network, Wireless Comms, Security, Industrial. (n.d.). Retrieved from https://www.postscapes.com/internet-of-things-protocols/.

Derenick, J., Thorne, C., & Spletzer, J. (2005). On the deployment of a hybrid free-space optic/radio frequency (FSO/RF) mobile ad-hoc network. 2005 IEEE/RSJ International Conference on Intelligent Robots and Systems. doi:10.1109/iros.2005.1545193.

Chereddi, C., Kyasanur, P., & Vaidya, N. H. (2007). Net-X. ACM SIGMOBILE Mobile Computing and Communications Review, 11(3), 84. doi:10.1145/1317425.1317435.

Jimmy Kyriannis. (2004). Our Third-Generation Campus Network. Connect: Information Technology at NYU, pp. 21-25.

Meshcoin. (2018). Retrieved from https://nycmesh.net/blog/meshcoin/.

Disruption Tolerant Networks and its relevance to IOT/M2M. (2015). Retrieved from http://meshdynamics.com/documents/MeshDynamicsDisruptionTolerantNetworks.pdf.

MeshDynamics Follow. (Feb. 3, 2013). Military, Defense and Public Safety Mesh Networks [MeshDynamics]. Retrieved from https://www.slideshare.net/DaCostaFrancis/military-defense-and-public-safety-mesh-networks.

Lounsbury, R. L., Jr. (2007). Optimum Antenna Configuration for Maximizing Access Point Range of an IEEE 802.11 Wireless Mesh Network in Support of Multimission Operations Relative to Hastily Formed Scalable Deployments (Unpublished master's thesis). Naval Postgraduate School, Monterey, California.

Harris. (2008). RF-6760W Wireless Message Terminal [Brochure]. Rochester, NY.

Information Sciences Institute. (1981). Transmission Control Protocol Darpa Internet Program Protocol Specification. Retrieved from https://tools.ietf.org/html/rfc793.

John Bicket, Sanjit Biswas, Daniel Aguayo, Robert Morris. (2005). Architecture and evaluation of an unplanned 802.11b mesh network. Proceedings of the 11th Annual International Conference on Mobile Computing and Networking—MobiCom 05. doi:10.1145/1080829.1080833.

Aymen Jegham. (2018). BeanDevice® Wilow® IoT starterGuidelines using MQTT protocol. Retrieved from https://beanair.com/wa_files/TN-RF-19-BeanDevice-Wilow-IoT-starter-Guidelines-using-MQTT-protocol.pdf.

Dust Netweorks. Technical Overview of Time Synchronized Mesh Protocol (TSMP). Technical Overview of Time Synchronized Mesh Protocol (TSMP), 2006.

Enlu, Eren. Doctoral Thesis. "Dynamic Bandwidth Allocation for RF Interconnection of a Network-on-Chip." CentraleSupelec, 0AD. No d'ordre : Jun. 21, 2016.

Lin, Jun, et al. "Using Blockchain to Build Trusted LoRaWAN Sharing Server." International Journal of Crowd Science, vol. 1, No. 3, Apr. 2017, pp. 270-280., doi:10.1108/ijcs-08-2017-0010.

"Communications Converged Application Server Diameter Application Development Guide." Lesson: All About Sockets (The Java™ Tutorials > Custom Networking), Oracle, Apr. 3, 2015, docs.oracle.com/cd/E49461_01/doc.70/e54626/toc.htm. Chapter 3: Using the Diameter Rf Interface Application for Offline Charging.

Graph, Coin. "What Is Blockchain Technology: A Step-by-Step Guide for Beginners." Medium, Augmenting Humanity, Mar. 10, 2018, medium.com/@coingraphIO/what-is-blockchain-technology-a-step-by-step-guide-for-beginners-a7ddaa57e5e1.

Bauerle, Nolan. "What Is the Difference Between a Blockchain and a Database?" CoinDesk, CoinDesk, Mar. 15, 2017, www.coindesk.com/information/what-is-the-difference-blockchain-and-database/.

Aruba Networks. (Mar. 2011). Next-Generation Wireless Mesh Networks: Combining a Multi-Radio Architecture with High-Performance Routing to Optimize Video Surveillance and Other Multimedia-Grade Applications. Next-Generation Wireless Mesh Networks: Combining a Multi-Radio Architecture with High-Performance Routing to Optimize Video Surveillance and Other Multimedia-Grade Applications, www.arubanetworks.com/pdf/technology/whitepapers/WP_WirelessMesh.pdf.

* cited by examiner

RF CLIENT FOR IMPLEMENTING A HYPER DISTRIBUTION COMMUNICATIONS PROTOCOL AND MAINTAINING A DECENTRALIZED, DISTRIBUTED DATABASE AMONG RADIO NODES

CROSS-REFERENCE TO RELATED APPLICATIONS

This application claims priority from U.S. Provisional Application No. 62/523,371, entitled "RF NETWORK EQUIPPED WITH AN IOT DEVICE COLLECTOR AND A CLIENT WHICH IMPLEMENTS BLOCKCHAINING AND A HYPER DISTRIBUTION COMMUNICATIONS PROTOCOL", which was filed on Jun. 22, 2017, and which is incorporated herein by reference in its entirety. This application also claims priority from U.S. Provisional Application No. 62/523,383, entitled "RF CLIENT FOR IMPLEMENTING A HYPER DISTRIBUTION COMMUNICATIONS PROTOCOL AND MAINTAINING A DECENTRALIZED, DISTRIBUTED DATABASE AMONG RADIO NODES", which was filed on Jun. 22, 2017, and which is incorporated herein by reference in its entirety. This application also claims priority from U.S. Provisional Application No. 62/523,397, entitled "IOT DEVICE COLLECTOR AND NORMALIZATION ENGINE", which was filed on Jun. 22, 2017, and which is incorporated herein by reference in its entirety.

TECHNICAL FIELD OF THE INVENTION

The present invention pertains generally to networks of RF nodes, and more particularly to an RF client which establishes a hyper distribution communications protocol among the nodes and maintains a decentralized, distributed database of transactions between the nodes.

BACKGROUND OF THE INVENTION

Various devices are known to the art which utilize radio frequency (RF) signals for the purposes of communication. Various technologies and protocols have also been developed in the art to allow these RF devices to communicate. At present, each of these technologies and protocols is directed to a specific use case or type of RF device.

For example, Z-Wave is a wireless communications protocol that has been primarily developed for use primarily for home automation. It is oriented to the residential control and automation market, and is intended to provide a simple and reliable method to wirelessly control lighting, HVAC, security systems, home cinema, automated window treatments, swimming pool and spa controls, and garage and home access controls. Like other protocols and systems aimed at the home and office automation market, a Z-Wave automation system can be controlled via the Internet, with a gateway or central control device serving as both the hub controller and portal to the outside.

Zigbee is an IEEE 802.15.4-based specification for a suite of high-level communication protocols developed to create personal area networks with small, low-power digital radios. The Zigbee specification is used in applications such as home automation, medical device data collection, and other low-power, low-bandwidth needs. Zigbee is designed for small scale projects which need wireless connection. Hence, Zigbee is a specification for low-power, low data rate, and close proximity (i.e., personal area) wireless ad hoc networks.

Bluetooth is a wireless technology standard for exchanging data over short distances from fixed and mobile devices, and for building personal area networks (PANs). This technology uses short-wavelength UHF radio waves in the ISM band from 2.4 to 2.485 GHz.

IEEE 802.11 is a set of media access control (MAC) and physical layer (PHY) specifications for implementing wireless local area network (WLAN) communications in the 900 MHz and 2.4, 3.6, 5, and 60 GHz frequency bands. These specifications provide the basis for wireless network products using the Wi-Fi brand.

Radio-frequency identification (RFID) is a technology which uses electromagnetic fields to automatically identify and track tags attached to objects. The tags contain electronically stored information, and may be active or passive devices. Active tags have a local power source, such as a battery, and may operate at hundreds of meters from the RFID reader, while passive tags rely on collecting energy from an RFID reader's interrogating radio waves, and hence require proximity to the reader. RFID tags are advantageous over barcodes in that the tag does not need to be within the line of sight of the reader, and hence may be embedded in the tracked object.

RFID is one method for implementing Automatic Identification and Data Capture (AIDC). RFID tags are used in many industries. For example, an RFID tag may be attached to an automobile during production and used to track the progress of the automobile through the assembly line. RFID-tagged pharmaceuticals may be tracked through warehouses. RFID microchips may be implanted in livestock and pets to allow for the positive identification of these animals.

Near-field communication (NFC) is a set of communication protocols that enable two electronic devices (one of which is usually a portable device such as a smartphone) to establish communication by bringing them within 4 cm (1.6 in) of each other. NFC devices are commonly used in contactless payment systems, similar to those used in credit cards and electronic ticket smartcards, and allow mobile payment to replace or supplement these systems. NFC is commonly used for social networking, for sharing contacts, photos, videos or files. NFC-enabled devices can act as electronic identity documents and keycards. NFC offers a low-speed connection with simple setup that can be used to bootstrap more capable wireless connections.

SUMMARY OF THE INVENTION

In one aspect, a system is provided which comprises (a) a plurality of RF devices, wherein each RF device contains a tangible, non-transient memory device; and (b) a software client, an instance of which is recorded in the memory device of each of said plurality of RF devices; wherein said software client contains suitable programming instructions which, when implemented by at least one processor of at least one computational device, implements a hyper distribution communications protocol among the RF devices and maintains a decentralized and distributed database of transactions between the RF devices.

In another aspect, a method is provided for establishing a network among a plurality of RF devices. The method comprises (a) implementing a hyper distribution communications protocol among the RF devices; and (b) maintaining a decentralized and distributed database of transactions between the RF devices.

In a further aspect, a system is provided which comprises (a) a plurality of RF devices, wherein each RF device contains a tangible, non-transient memory device; and (b) a software client, an instance of which is recorded in the memory device of each of said plurality of RF devices; wherein said software client contains suitable programming instructions which, when implemented by at least one processor of at least one computational device, implements a hyper distribution communications protocol among the RF devices and maintains a decentralized and distributed database of transactions between the RF devices.

In another aspect, a method for establishing a network among a plurality of RF devices is provided. The method comprises (a) implementing a hyper distribution communications protocol among the RF devices; and (b) maintaining a decentralized and distributed database of transactions between the RF devices.

In yet another aspect, a network is provided which comprises (a)m a plurality of radio nodes which are in RF communication with each other, wherein said plurality of radio nodes includes first and second radio nodes that communicate via first and second distinct RF protocols or RF technologies; and (b) an RF collector which aggregates the RF communications from the plurality of radio nodes and normalizes those RF communications into a singular output format.

In a further aspect, a method for establishing a communications network among a plurality of radio nodes is provided. The method comprises (a) organizing the plurality of radio nodes into a network in which each of said radio nodes are in RF communication with each other, wherein said plurality of radio nodes includes first and second radio nodes that communicate via first and second distinct RF protocols or RF technologies; (b) aggregating the spectrum of RF communications from the plurality of radio nodes; and (c) normalizing the aggregated RF communications into a singular output format.

BRIEF DESCRIPTION OF THE DRAWINGS

For a more complete understanding of the present invention and the advantages thereof, reference is now made to the following description taken in conjunction with the accompanying drawings in which like reference numerals indicate like features.

DETAILED DESCRIPTION OF THE INVENTION

With the advent of the Internet of Things (IoT), various items have been embedded with electronics, software, sensors, actuators, and network connectivity to enable these objects to collect and exchange data. However, despite the development of a large variety of such devices, at present, the collection and exchange of data tends to occur within discrete silos.

For example, at present, no standard communications protocols exist for the light switches in a house to talk to each other. While some instances of bridge software and communications protocols have been developed for devices of this type, at present, these software programs and communications protocols have been specific to particular devices and use cases. For example, in a home, there may be many different systems, such as temperature, lights, garage doors, locks, HVHD, and audio systems. Each of these devices is equipped with separate applications and communicates via separate RF principles and separate controllers. This problem is further exacerbated in the commercial spectrum.

This situation is at least partially a result of the disparate technologies and protocols that have been developed to enable these devices to collect and exchange data. In particular, at present, no standard communications vehicle exists between such devices and their master (the latter of which may be, for example, a user interface, a collection agent, an upstream router, or the like). For example, although home standards (such as Zigbee and Z-wave), business standards (such as RFID and 802.11), and international standards (such as Bluetooth and NFC) have all been developed, at present, no solution has been produced to date to aggregate a spectrum of disparate RF communications and normalize them into a singular output format.

The foregoing problem is two-fold, in that no standards exist for either the IoT or for IoT communications. By way of example, no communications standards currently exist to allow the light switches in a house to talk to each other. Although some bridge software and some communications protocols have been developed for this purpose, to date, these solutions have always been specific. On the other hand, a wide spectrum of RF devices currently exists. For example, a typical home may feature such diverse systems as thermostats, lights, garage doors, locks, HVHD, audio systems, and the like. Each of these is typically equipped with different applications based on different RF principles, and is provided with separate controllers. This problem is even further exacerbated in the commercial spectrum. It will thus be appreciated that the plethora of RF devices developed in the art, and the variety of RF technologies and protocols that have been developed to allow these devices to communicate, has created an impediment to implementation of the Internet of Things (IoT).

It has now been found that the foregoing issue may be addressed with the systems and methodologies disclosed herein. In a preferred embodiment, these systems and methodologies comprise an RF collector which aggregates a spectrum of RF communications from a spectrum of RF devices, and which normalizes the RF communications into a singular output. The RF collector accomplishes this through the use of an RF client, instances of which are associated with each RF device. The RF client implements a protocol which facilitates communication among the RF devices. The communication protocol preferably leverages principles of blockchaining and hyper distribution communications protocols (such as, for example, bit torrent) to provide a highly secure network of radio nodes that are organized in a mesh topology. The radio nodes are preferably equipped with a suitable client which implements the protocol to provide always-on, one-to-many communications among the radio nodes that can leverage full streaming network concepts such as 5G.

It will be appreciated from the foregoing that the devices and methodologies disclosed herein effectively provide a network which comprises (a) a plurality of radio nodes (which may be selected from a wide spectrum of RF devices) which are in communication with each other and which are organized in a mesh topology; (b) an RF collector which aggregates a spectrum of RF communications from the plurality of radio nodes and normalizes those RF communications into a singular output format; and (c) an RF client, an instance of which is associated with each radio node, wherein the RF client implements a hyper distribution communications protocol among the nodes, and wherein the client maintains a decentralized and distributed database of transactions between the radio nodes.

The systems and methodologies disclosed herein may be further appreciated with respect to the use case of a shipping port. Such a port may receive a cargo container from overseas that may have multiple types of cargo in it (i.e., it may be a mixed-mode cargo container). For example, the cargo container may contain an automobile for an individual, some electronic appliances from a large electronics company, and toys from a toy manufacturer.

The individual shipping the car is not likely to be a repeat shipper, and may not be well versed in the process involved. In present practice, the individual (or the individual's representative) will typically go to the shipping office and fill out papers that are placed in a plastic envelope. These papers essentially form the manifest for the automobile. Customs agents will review the manifest, levy taxes, and perform other such actions based on the manifest. At some point, it will typically be necessary for someone to manually enter all of the data into the manifest. This data may include, for example, the serial numbers, tracking numbers, warrants, customs, and other details required to get the automobile into the country in which the port is located.

The large electrical appliance company has likely been shipping appliances for years, and is accordingly likely to be well-versed in all of the shipping systems and ports. This company may have a digital manifest with one or more RFIDs in the containers of its products.

The toys being shipped by the toy company may be in corrugated cardboard containers with printed barcodes on them. In current practice, it is typically necessary to scan these barcodes with a portable device.

In this example, there are three different input mediums with the same output medium (i.e., a shipping manifest, which is likely a standard manifest that shipping companies and shipping yards use). Since shipping yards improve their profitability and competitive edge by processing more containers than competing yards, they are always competing for more capacity and speed. Hence, the use of collectors of the type disclosed herein provide a competitive advantage for such business entities.

Figure 1:
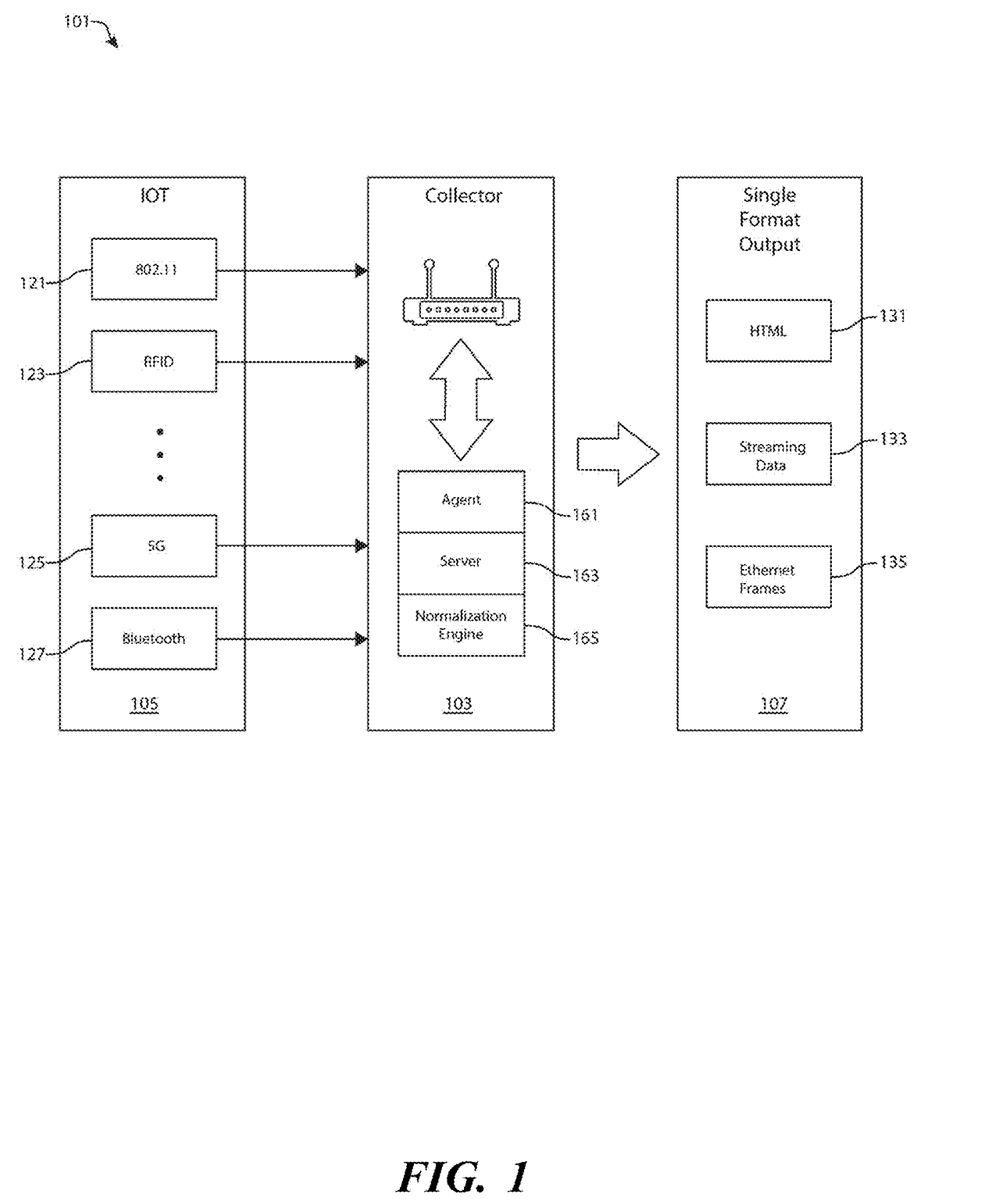
FIG. 1 is an illustration of an embodiment of an architecture for an IoT collector in accordance with the teachings herein.

FIG. 1 illustrates a first particular, non-limiting embodiment of a system architecture 101 featuring a collector 103 in accordance with the teachings herein. In essence, in its preferred embodiment, the collector 103 is a device with many different inputs 105 and a singular output format 107. The inputs 105 may include, for example, 802.11 (Wi-Fi) 121, RFID 123, 5G radio 125 and Bluetooth 127. Each of these inputs 105 may require a different antenna. The collector 103 is preferably equipped with an agent 161 and a normalization engine 165, and works in conjunction with one or more server 163. The singular output format 107 may be, for example, HTML 131, streaming data 133 or Ethernet frames 135.

Figure 2:
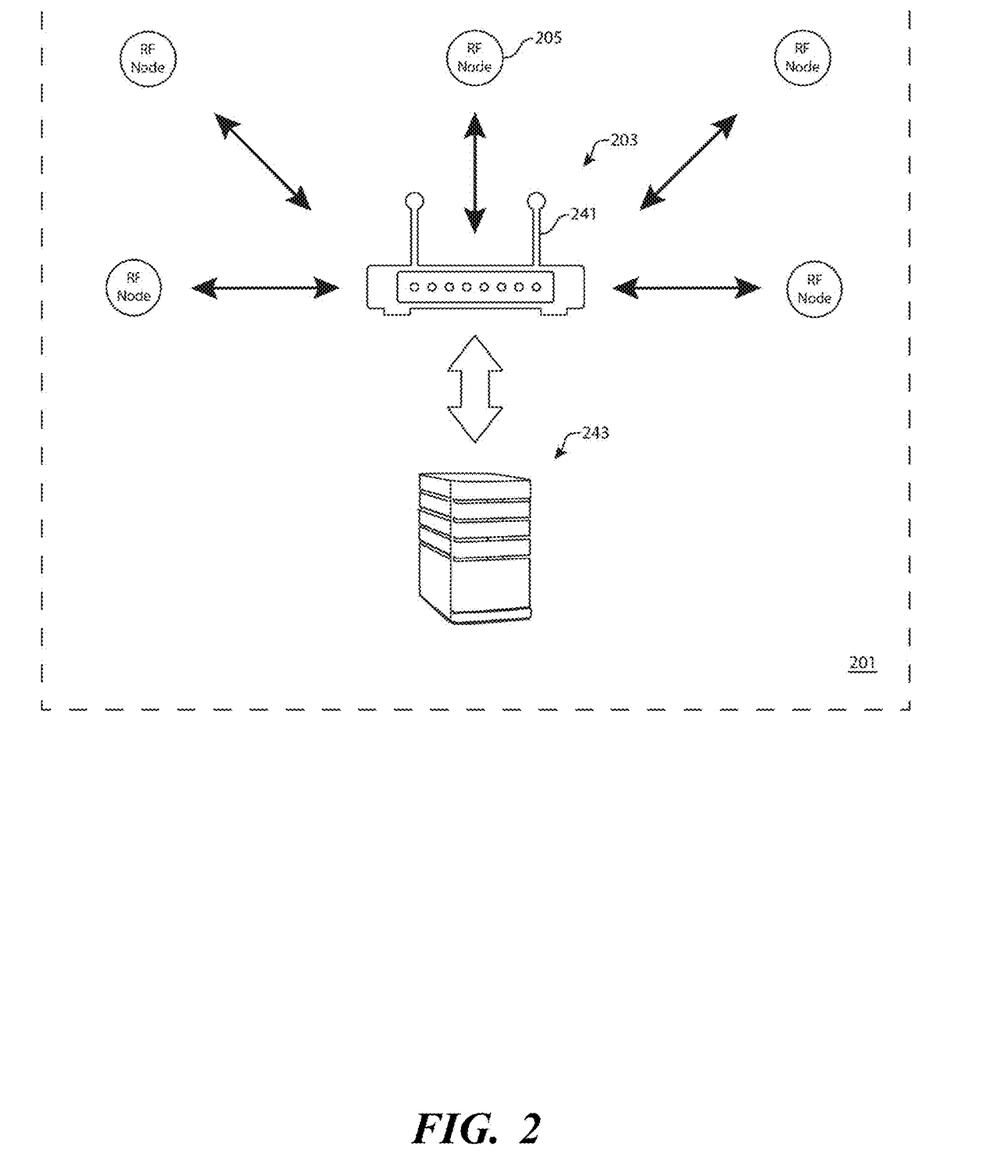
FIG. 2 is an illustration of a system featuring an RF collector in accordance with the teachings herein.

FIG. 2 depicts a particular, non-limiting embodiment of a system in accordance with the teachings herein. The system 201 includes a collector 203 equipped with a set of antennas 241 that receive known, configured input from various RF end devices or RF nodes 205, and that work in conjunction with one or more servers 243 to take suitable action. This is preferably accomplished through the use of the client 301 depicted in FIG. 3.

For example, if the RF node 205 that the collector 203 is receiving RF input from is a phone, the collector 203 may implement a handshake, obtain a VSID and/or SSID, negotiate the conversation, establish a pairing relationship with the phone, and begin to receive Internet traffic. If the RF node 205 that the collector 203 is receiving RF input from is an RFID device, the collector 203 may establish a connection, scan the device, receive data packets from the device, and then decode the required data. If the RF node 205 that the collector 203 is receiving RF input from is a Bluetooth device, the collector 203 may excite or turn off the RF device if it is proximal to the collector 203, offer to pair, or take other suitable actions.

The one or more servers 243 associated with the collector 203 then takes the foregoing traffic and acts accordingly. In the case of traffic involving a Bluetooth device, the one or more servers 243 may establish communication and ask for a data stream. In the case of traffic involving an RFID device, the one or more servers 243 may operate in receive-only mode, receive the data, normalize it, and send it out. In the case of traffic involving an 802.11 device, the one or more servers 243 may provide encryption keys, software and call set-up.

Notably, some of the formats associated with RF devices are data formats, while others are transit formats. For example, RFID and Bluetooth are data formats, while ethernet (the only format 802.11 hosts) and 5G are transit formats. Hence, instead of sending an ethernet frame, the collector may normalize that output to a single format, which may vary from one use case to another.

As a particular, non-limiting example of the foregoing principles, the RF device may be smart luggage with an HTML output. It may be desirable to display the state of the luggage on a terminal (e.g., in the baggage claim area of an airport). For example, the owner of the luggage may wish to be notified when the luggage is expected to arrive at baggage claim, if it is still enroute, if it is still on the plane, or if it never left the departure city. This information may be part of the HTML output, which may be normalized and displayed on the display.

As another particular, non-limiting example of the foregoing principles, a plastic bracelet may be assigned to a patient when they check into an emergency room. The bracelet may be equipped with an RFID sensor to allow it to sense where the associated patient is in queue, and may display that information on an HTML board with appropriate messages (e.g., please return to the lobby).

As a further particular, non-limiting example of the foregoing principles, museums may be equipped with RF translation devices which operate in proximity to various targets disposed throughout the museum.

In each of the foregoing use cases, it may be desirable to take the output of the RF input and display it in an online, real-time web type of capacity.

The systems, devices and methodologies disclosed herein may also be utilized in conjunction with streaming data. For example, it may be desirable to terminate an 802.11 from a camera and pass it to a DVR application running on the server. From there, it may be sent out as a stream of data to be recorded to a hard disk (e.g., for posterity).

Another use case for streaming data exists with respect to collecting beacons. In one particular, non-limiting embodiment of a use case involving the deployment of beacons, the beacon acts as an RF antenna which announces its presence, and a mobile device acknowledges the announcement. There is typically no more conversation, set-up or data. Hence, this use of beaconing may involve a type of streaming data.

For example, it may be desirable shortly after a game at a stadium to have the streetlights outside of the stadium turn red more frequently so pedestrians can cross the street. It may also be desirable at that time to increase police presence or arrange for emergency medical team standby. Streaming data may be utilized to make these decisions by determining where the crowd is going, as well as its ebb and flow. In such a case, the stream may be ignored until such time as it is desirable to take action based on it.

A further use case involves ethernet frames. In this application, the collector may be utilized as a normal axis point, and a mobile phone or mobile device may connect to the collector to access the Internet.

Use cases also exist which involve manual input. In such cases, someone could connect to the collector and perform data entry or OCR of documents (e.g., a shipping manifest) into an HTML page.

Various business models may be applied to the foregoing use cases. These may include, for example, consulting services around the creation of the output and the normalization and its customization to what a business wants. For example, in shipping yard applications, a party may charge a first fee for installing the collectors, and a second fee to write a manifest normalization engine.

Various applications also exist in which the interested parties have businesses centered around the manufacture of devices for telecommunications companies and municipalities. For example, a company manufacturing streetlights could install a collector of the type disclosed herein in their product. In such an application, installation of the collector on streetlights could occur on an existing install basis with an existing product, thus obviating the need to remove infrastructure to add new or enhanced capabilities. The new or enhanced capabilities could then be sold back to another party (such as, for example, a telecommunications company), could be provided by a governmental entity as a benefit to its citizens, or could be used to attract new businesses (e.g., it could allow a municipality to better compete for conventions and tourism). This approach could also be used in some applications (such as, for example, parking lots, stadiums, private streets, telecommunications areas or government areas) where entities desire exclusive control over these capabilities and want to keep the axis point for themselves.

The collector may also be utilized in healthcare facilities such as hospitals, nursing homes and emergency care centers. A typical healthcare facility is equipped with various medical devices (such as, for example, blood pressure monitors, heart rate monitors, blood oxygen levels, thermometers, and aspiration devices) which may be manufactured by different companies, and which may not communicate with each other, even though they may be equipped with wireless communication capabilities. Moreover, concerns exist about isolating one patient's readings from those of another (the protocol, discussed below, talks about the security aspects of this). Consequently, despite the wireless communications capabilities of these devices, it is common for healthcare facilities to have medical staff manually read the data from these devices.

The systems and methodologies described herein may be utilized to collect input from the various medical devices and create a singular output that describes a particular patient (and all of the inputs and outputs associated with that patient) as a piece of streaming data. This data may be provided to appropriate healthcare personnel. For example, a treating physician may utilize the data to make a diagnosis or prescribe medications. This data stream can also be utilized to generate an alert if, for example, it is in communication with some AI system or some business analytics system and it recognizes the signature or thumbprint of a medical event (such as, for example, the onset of a heart attack or stroke). Although there may be instances of this type of procedure being implemented on a singular device, such devices do not operate in a holistic capacity, due to the lack of a means by which the different devices can communicate. It will thus be appreciated that the collectors described herein may be utilized as a type of "healthbus" for these different protocols, thus allowing these different devices to communicate with each other.

In the 5G arena, it is likely that some parties will desire legacy connectivity. The collectors described herein may be utilized to provide a migration path from old to new. In such cases, the collectors described herein may be fabricated from commercial, off-the-shelf components, but will require the agent, the server and the normalization engine. These may be advantageously written in the language Go, since it is a cross-platform compiled language that may be written for any stack. The use of Go also provides for ready migration, because all of the binaries and libraries that make the application unique are encapsulated in one single file (this allows the application to be moved to any desired platform, and also allows the application to cross-compile immediately). Moreover, since Go is based off of a series of open source standards, it is not necessary to create constructs such as a network stack, a UI stack or an API call from scratch. Instead, it is typically only necessary to add the logic of what the application is doing. The agent will preferably be equipped with a TSR (Terminate and Stay Resident) application that will function as a daemon that runs all the time and listens for items of interest to the application. The server may be invoked by the agent or by a user's input to process something in an IFTT (If This Then That) type of capacity.

The normalization engine preferably runs as part of the agent and sends normalized data out, either in real-time or sequentially. These may be compiled services that may be run (in Go) in containers as microservices.

Figure 3:
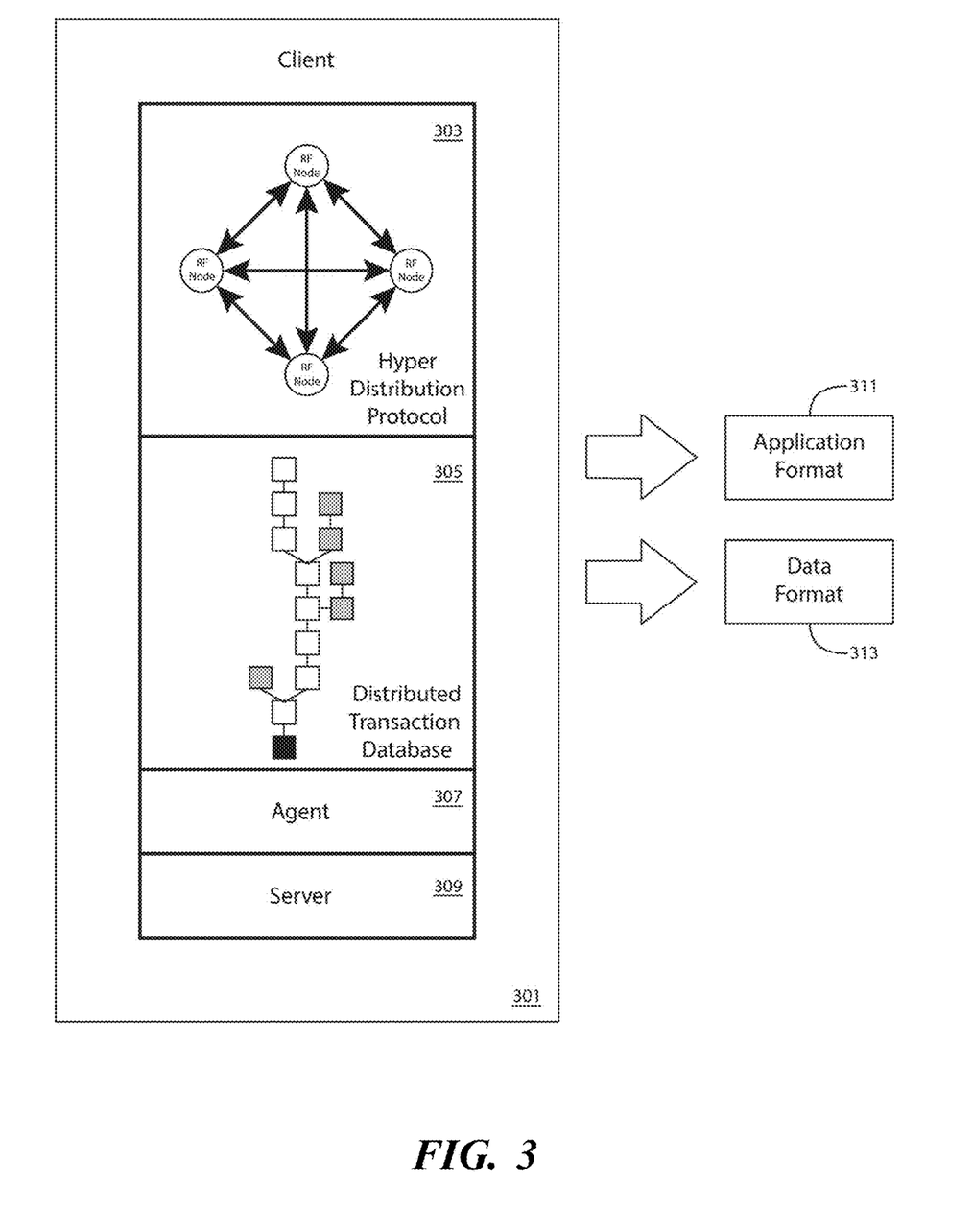
FIG. 3 is an illustration of an embodiment of a software client which implements a hyper distribution communications protocol and distributed transaction database for use in conjunction with the IoT collector of FIG. 1.

FIG. 3 depicts a particular, non-limiting embodiment of an RF client 301 in accordance with the teachings herein. With reference thereto, in a preferred embodiment, the protocol disclosed herein is implemented by the RF client 301 as a hyper distribution communications protocol 303 among the RF nodes, one in which the client 301 maintains a decentralized and distributed database 305 of transactions between the RF nodes. In an especially preferred embodiment, the protocol 305 is based on the principles of blockchain and bit torrent. Both concepts have commercial and open source packages, some of which are incorporated into products, and some of which are standalone. The RF client 301 RF client 301 is further equipped with agent 307 and server 309 modules with associated functionalities, and is adapted to provide output in application 311 or data 313 format.

Bit torrent is a mesh or peer-to-peer networking technology. Of any three nodes that communicate with each other, none of the parties is required to be the server. Rather, all three nodes have a piece of the data in parity, and may act in concert to form copies. If one of the nodes dies out, the other two will finish the replication themselves. If there is an update to be implemented, the update gets pushed out en masse until all of the nodes have it.

Bit torrent is currently used to accelerate downloads. The bit torrent protocol also allows a user to throttle or to metricize one download, stream, file or load higher than another. Prioritization may be set based on trust so that if the same file is available from multiple sources, the download will occur from the most trusted source. Bit torrent also maintains a list of its peers, and can track up or down and speed.

The combination of blockchain and bit torrent in the systems and methodologies described herein provides a powerful, secure, scalable, non-repudiated, encrypted means of communication. However, the two are separate programs. In particular, one of these programs occurs at the software or application level and has nothing to do with transit, and the other occurs at the transit or network level. Since there are no linkages between them, it may be necessary to create software that takes input and manipulates it in the network infrastructure (a la bit torrent). This software may also be equipped with an agent and a server (not the same as those of the collector). The collector may merely act as a dumb device to terminate one connection, normalize it and send it out.

The protocols disclosed herein may (but is not required to) be used in conjunction with a plurality of collectors, wherein the protocol is the way the collectors work with each other. In such a configuration, the agent would may be adapted to listen (a la bit torrent) for communication.

The foregoing principles may be further understood by considering the use case of RFID devices having limited battery life. If 20 of these devices are disposed inside of a carton, one of the devices can be nominated the master device, and can take a peer-to-peer range of the other 19 devices. After this, the master device may power down the antennae of the remaining devices, and each of the remaining devices can cease any further communications as long as their states have not changed. When the container is excited, the manifest file of a blockchain may be utilized to get the details of the 19 other devices by having the master device communicate with them. This approach conserves battery life, and increases the ability of the RFID devices. Using the concept of bit torrent, once the master device has been removed from the group (because it has been sold or has otherwise left the collective), the remaining devices can do a peer check and promote a new master, whose antenna can then be activated.

Extending the foregoing example to the aforementioned use case of a set of light posts near a stadium, suppose two of the light posts are not working. The other light posts will know that those light posts are offline, and will reroute traffic accordingly, because they note the gap in the light post sequence. As soon as the down light posts come back online, the communication vehicle may be reformed, taking the shortest path.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise indicated, the use herein of the conjunctive "or" shall be construed inclusively. Thus, for example, the phrase "A or B" shall be construed to include only A, only B, and A and B.

The devices and methodologies disclosed herein may be implemented by, or through the use of, suitable software. Such software may comprise suitable programming instructions recorded in a tangible, non-transient medium, such as a memory device. Various suitable memory devices are known to the art and may include, without limitation, hard drives and RAM-based or flash-based memory media.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A network, comprising:
a plurality of radio nodes which are in communication with each other and which are organized in a mesh topology, wherein said plurality of radio nodes include first and second sets of RF devices that communicate via first and second distinct protocols or RF technologies;
an RF collector which aggregates a spectrum of RF communications from the plurality of radio nodes, thereby obtaining aggregated RF communications, and which normalizes the aggregated RF communications into a singular output format; and
an RF client, an instance of which is associated with each radio node, wherein said RF client implements a hyper distribution communications protocol among the nodes, and wherein said client maintains a decentralized and distributed database of transactions between the radio nodes;
wherein said spectrum of RF communications includes RF communications which utilize electromagnetic fields to automatically identify and track RFID tags attached to objects, wherein said RFID tags contain electronically stored information, and wherein said RFID tags are selected from the group consisting of passive tags which collect energy from interrogating radio waves of a proximal RFID reader, and active tags which are equipped with a local power source.
2. The network of claim 1, wherein the plurality of radio nodes are in an always-on and a one-to-many communication with each other.

3. The network of claim 1, wherein said client uses blockchain technology to maintain the database.

4. The network of claim 1, wherein each of said radio nodes has a public key and a private key, wherein each communication from a first of the plurality of radio nodes to a second of the plurality of radio nodes includes a digital signature and a timestamp, wherein the digital signature is formed from the private key of the first of the plurality of radio nodes and the public key of the second of the plurality of radio nodes, and wherein each communication from a first of the plurality of radio nodes to a second of the plurality of radio nodes is broadcast to the other radio nodes in the network.

5. The network of claim 1, wherein the RF collector comprises a plurality of RF antennas.

6. The network of claim 1, wherein said hyper distribution communications protocol provides peer-to-peer sharing of data between said radio nodes over said network.

7. The network of claim 1, wherein said plurality of radio nodes are in wireless communication with each other and which are organized in a wireless mesh topology, and wherein said wireless mesh topology utilizes shortest path bridging.

8. The network of cam 1, wherein said network is a fully connected network.

9. The network of claim 1, wherein said hyper distribution communications protocol is bit torrent.

10. The network of claim 1, wherein said network is a peer-to-peer network that timestamps records in the distributed database by hashing the records into an ongoing chain of hash-based proof-of-work, and wherein hashing the records forms a record that cannot be changed without redoing the proof-of-work.

11. The network of claim 1, wherein said network is a peer-to-peer network that uses a defined consensus mechanism to prevent modification of an ordered series of time-stamped records.

12. The network of claim 1, wherein said decentralized and distributed database of transactions is a blockchain.

13. The network of claim 1, wherein said decentralized and distributed database of transactions is a distributed ledger system.

14. The network of claim 1, wherein said spectrum of RF communications includes RF communications employing the low-latency transmission of small data packets at data rates up to 100 kbit/s.

15. The network of claim 1, wherein said spectrum of RF communications includes RF communications employing a wireless communications protocol selected from the group consisting of (a) protocols for the creation of personal area networks, (b) protocols for the creation of ad hoc networks, (c) protocols based on an IEEE 802.15.4 specification, and (d) protocols for home automation.

16. The network of claim 1, wherein said spectrum of RF communications includes RF communications employing a wireless technology standard for exchanging data using short-wavelength UHF radio waves in the ISM band from 2.4 to 2,485 GHz.

17. The network of claim 1, wherein said spectrum of RF communications includes RF communications which utilize a set of media access control (MAC) and physical layer (PHY) specifications for implementing wireless local area network (WLAN) communications.

18. The network of claim 1, wherein said communications are in the 900 M Hz and 2.4, 3.6, 5, and 60 GHz frequency bands.

19. The network of claim 1, wherein said spectrum of RF communications includes RF communications selected from the group consisting of Bluetooth, RFID, 802.11, ZigBee and Z-wave.

20. A network, comprising:
a plurality of radio nodes which are in communication with each other and which are organized in a mesh topology, wherein said plurality of radio nodes include first and second sets of RF devices that communicate via first and second distinct protocols or RF technologies;
an RF collector which aggregates a spectrum of RF communications from the plurality of radio nodes, thereby obtaining aggregated RF communications, and which normalizes the aggregated RF communications into a singular output format; and
an RF client, an instance of which is associated with each radio node, wherein said RF client implements a hyper distribution communications protocol among the nodes, and wherein said client maintains a decentralized and distributed database of transactions between the radio nodes;
wherein each of said radio nodes has a public key and a private key, wherein each communication from a first of the plurality of radio nodes to a second of the plurality of radio nodes includes a digital signature and a timestamp, wherein the digital signature is formed from the private key of the first of the plurality of radio nodes and the public key of the second of the plurality of radio nodes, and wherein each communication from a first of the plurality of radio nodes to a second of the plurality of radio nodes is broadcast to the other radio nodes in the network.

21. The network of claim 20, wherein the plurality of radio nodes are in an always-on and a one-to-many communication with each other.

22. The network of claim 20, wherein said client uses blockchain technology to maintain the database.

23. The network of claim 20, wherein the RF collector comprises a plurality of RF antennas.

24. The network of claim 20, wherein said hyper distribution communications protocol provides peer-to-peer sharing of data between said radio nodes over said network.

25. The network of claim 20, wherein said plurality of radio nodes are in wireless communication with each other and which are organized in a wireless mesh topology, and wherein said wireless mesh topology utilizes shortest path bridging.

26. The network of claim 20, wherein said network is a fully connected network.

27. The network of claim 20, wherein said hyper distribution communications protocol is bit torrent.

28. The network of claim 20, wherein said network is a peer-to-peer network that timestamps records in the distributed database by hashing the records into an ongoing chain of hash-based proof-of-work, and wherein hashing the records forms a record that cannot be changed without redoing the proof-of-work.

29. The network of claim 20, wherein said network is a peer-to-peer network that uses a defined consensus mechanism to prevent modification of an ordered series of time-stamped records.

30. The network of claim 20, wherein said decentralized and distributed database of transactions is a blockchain.

31. The network of claim 20, wherein said decentralized and distributed database of transactions is a distributed ledger system.

32. The network of claim 20, wherein said spectrum of RF communications includes RF communications employing the low-latency transmission of small data packets at data rates up to 100 kbit/s.

33. The network of claim 20, wherein said spectrum of RF communications includes RF communications employing a wireless communications protocol selected from the group consisting of (a) protocols for the creation of personal area networks, (b) protocols for the creation of ad hoc networks, (c) protocols based on an IEEE 802.15.4 specification, and (d) protocols for home automation.

34. The network of claim 20, wherein said spectrum of RF communications includes RF communications employing a wireless technology standard for exchanging data using short-wavelength UHF radio waves in the ISM band from 2.4 to 2.485 GHz.

35. The network of claim 20, wherein said spectrum of RF communications includes RF communications which utilize a set of media access control (MAC) and physical layer (PHY) specifications for implementing wireless local area network (WLAN) communications.

36. The network of claim 20, wherein said communications are in the 900 MHz and 2.4, 3.6, 5, and 60 GHz frequency bands.

37. The network of claim 20, wherein said spectrum of RF communications includes RF communications selected from the group consisting of Bluetooth, RFID, 802.11, ZigBee and Z-wave.

* * * * *